No. 811,137. PATENTED JAN. 30, 1906.
S. S. EVELAND.
ELECTRIC RIVETER.
APPLICATION FILED SEPT. 13, 1904.

Witnesses
W. A. Williams
Jas. A. Richmond

Inventor
Samuel S. Eveland
By,
Augustus B. Stoughton.
Attorney

UNITED STATES PATENT OFFICE.

SAMUEL S. EVELAND, OF PHILADELPHIA, PENNSYLVANIA.

ELECTRIC RIVETER.

No. 811,187.

Specification of Letters Patent.

Patented Jan. 30, 1906.

Application filed September 13, 1904. Serial No. 224,345.

*To all whom it may concern:*

Be it known that I, SAMUEL S. EVELAND, a citizen of the United States, residing at Philadelphia, in the county of Philadelphia and State of Pennsylvania, have invented a certain new and useful Electric Riveter, of which the following is a specification.

One object of the present invention is to provide a simple, reliable, and comparatively inexpensive apparatus for electric riveting.

Another object of the invention is to provide for localizing the heat of electrical resistance at the end of the rivet where the head is to be formed and to provide for silently forming the head.

To these and other ends hereinafter set forth the invention comprises the improvements to be presently described and finally claimed.

The nature, characteristic features, and scope of the invention will be more fully understood from the following description, taken in connection with the accompanying drawings, forming part hereof, and in which—

Figure 1:
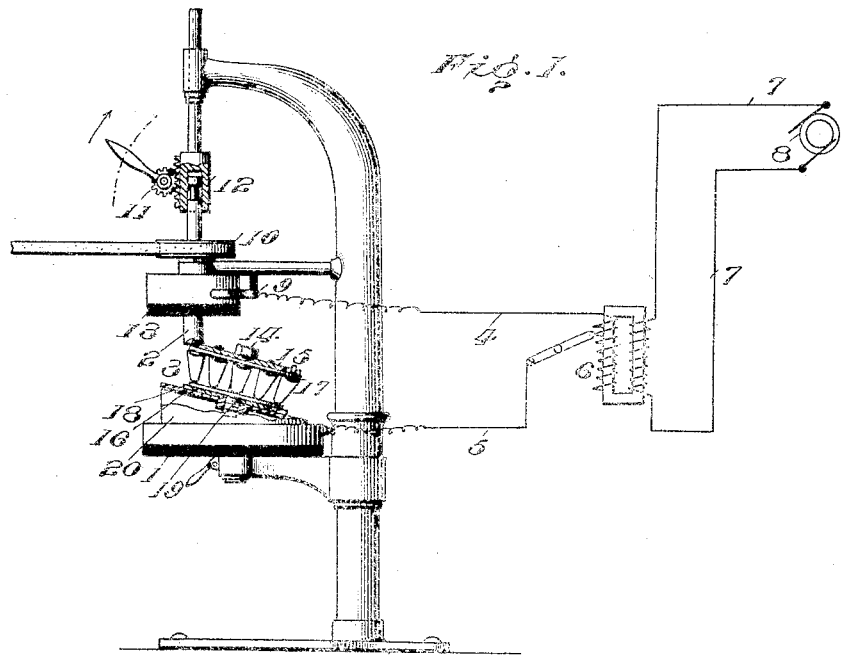
Figures 2, 3:
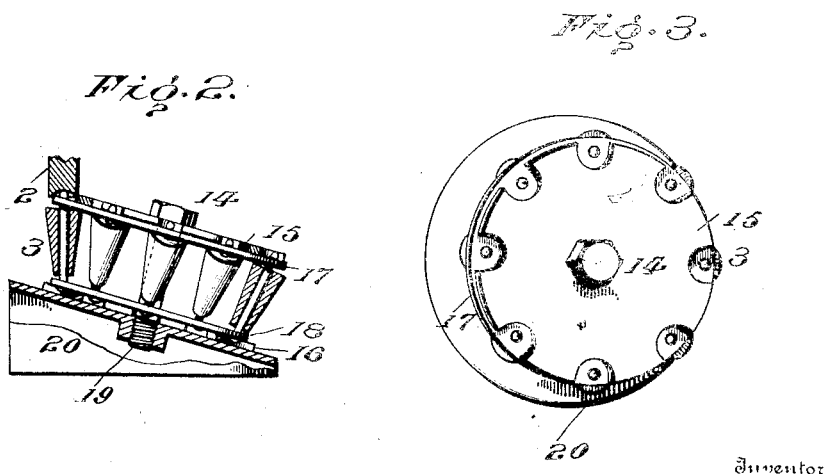

Figure 1 is a view, partly in section and partly in elevation, illustrating apparatus embodying features of the invention. Fig. 2 is a sectional view drawn to an enlarged scale and illustrating details of construction, and Fig. 3 is a top or plan view showing details of the arrangement illustrated in Fig. 2.

In the drawings, 1 is a fixed and 2 is a rotating part between which the rivet 3 may be placed.

4 and 5 are the conductors of an ordinary heating-circuit, and they are shown to comprise the secondary circuit of the transformer 6, whose primary circuit 7 includes the generator 8. The parts 1 and 2 are in electrical connection with the conductors 4 and 5. In the case of the part 2 this is accomplished by means of the contact-brush 9.

The parts 1 and 2 are susceptible of embodiment in a variety of forms. The header 2 is an electrode. However, as shown, the part 1 may be taken to be the table, and the part 2 is the header or element that makes the heads on the ends of the rivets, and it is shown as the spindle of a drill-press. The part 2 is rotated, for example, by means of the belt and pulley 10 and is endwise adjustable by means of the mechanism 11, which operates upon the chuck 12, in which the part 2 revolves. The contact-brush is shown as bearing upon a drum, the lower portion 13 of which may be of insulating material, so that when the spindle 2 is in elevated position the circuit is interrupted, but when it is in depressed position the spindle 2 is included in the circuit.

When the rivet 3 is in position upon the part 1 and the end of the spindle 2 is brought into contact with its upper end, the rivet is included in the circuit and the rotary or rubbing contact between the lower end of the spindle and the upper end of the rivet opposes such resistance to the passage of the current that the heating effect is localized at the upper end of the rivet. The exertion of comparatively slight downward pressure upon the spindle, as by means of the mechanism 11, will cause the heated end of the rivet to be spun into a head. The form of the lower end of the spindle 2, whether convex, concave, or otherwise, will determine the shape of the head of the rivet. In some cases it may be desirable to further insure the concentration of the heating effect at the upper end of the rivet. For this purpose use may be made of a jig 14, which extends upward from the part 1 and affords a path between itself and the rivet near the upper end of the latter. The jig shown is designed for use in riveting the arbors of roller-bearing cages of generally conical shape. The jig comprises peripherally-notched disks 15 and 16, which are placed outside of the rings 17 and 18 of the cage and are in electrical connection with the spindle 19. The notches of the disks accommodate the ends of the rivets, and the arms between the notches afford paths of good conductivity from whence the heads of the rivets to the conducting part 1. The face of the base 20 is inclined so as to present the rivets in vertical position to the spindle 2. To rivet the cage, all that is necessary is to rotate it about the part 19, bringing the rivets successively into line with the spindle 2, which operates to spin heads upon their heated ends in the manner described.

It will be obvious to those skilled in the art to which the invention relates that modifications may be made in details without departing from the spirit thereof. Hence the invention is not limited further than the prior state of the art may require; but,

Having thus described the nature and objects of my invention, what I desire to secure by Letters Patent and claim as new is—

1. An electric riveter provided with an electrode constituting a header, and means for retating the electrode in substantially the same spot on the rivet whereby the heating effect is localized.

2. An electric riveter provided with an electrode constituting a header, means for rotating said electrode to localize the heating effect near the end of a rivet, and devices for causing the electrode to contact with the end of the rivet to head up the locally-heated part thereof, substantially as described.

3. An electric riveter provided with an electrode constituting a header, means for rotating said electrode to localize the heating effect at the end of a rivet, an electrode constituting a support for the rivet, and devices for causing said electrodes to approach so as to head up the hot end of the rivet, substantially as described.

4. In combination a fixed and an axially-movable revoluble part, means for shifting and rotating the revoluble part, a heating-circuit including said parts, and a jig consisting of notched disks and an inclined spindle upon which they are revoluble, substantially as described.

In testimony whereof I have hereunto signed my name.

SAMUEL S. EVELAND.

Witnesses:
K. M. GILLIGAN,
JAS. A. RICHMOND.